United States Patent Office 3,114,040
Patented Dec. 10, 1963

3,114,040
METHOD AND APPARATUS FOR DETERMINING THE SPECTRUM OF AN ALPHA RADIATION SOURCE
Henryk Ludwik Zaborowski, Paris, France, assignor to Commissariat a l'Energie Atomique, Paris, France
Filed Aug. 5, 1959, Ser. No. 831,778
Claims priority, application France Aug. 7, 1958
8 Claims. (Cl. 250—71.5)

The present invention is concerned with a method of and apparatus for determining the spectrum of a source which emits α radiation.

The spectra of α radiation are at present measured by means of three types of appliances using the following different principles:

(1) The spectra are photographed on nuclear plates consisting of backings having deposited on them an emulsion of suitable thickness and nature which is sensitive to the radiation of which it is desired to measure the energy. This process is reliable, but examination of the traces of the α particles in the nuclear plates, that is to say measurement of their length, takes a very long time and requires specialised personnel.

(2) Use is also made of pulse chambers consisting of two plane parallel electrodes at different potentials in order to set up a uniform electric field in the space separating them; these electrodes are disposed in an enclosure filled with gas. The introduction of an α particle into this enclosure partially ionises the gas in it; the accumulation of charges on the collector electrode sets up an electrical potential difference which produces a pulse, in suitable circuit, whereof the amplitude is proportional to the energy of the particle. This process allows of accurate measurements, but is critical to handle.

(3) Another method consists in using gaseous scintillators which emit photons each time one of their molecules is struck by an α particle. This emission is proportional to the energy given up by the particle to the scintillating gas; the photons are detected by a photomultiplier associated with conventional electronic apparatus. This latter process requires the use of very pure gases in order to prevent scintillation from being extinguished.

According to the present invention there is provided apparatus for determining the spectrum of an α-emitting radioactive source, the apparatus comprising a hemispherical receptacle adapted for mounting upon a photomultiplier to make sealing engagement therewith having a reflective, scintillating interior surface and having means for controlling the pressure of a gas within the receptacle when closed by the photomultiplier, in operation the radiation source being located in the region of the centre of the hemisphere and the photocathode of the photomultiplier seeing the said interior surface.

According to a further feature of the present invention there is provided apparatus for determining the spectrum of an α-emitting radioactive source, the apparatus comprising a hemispherical receptacle adapted for mounting upon a photomultiplier to make sealing engagement therewith, having a non-reflective scintillating substance on the interior surface thereof, having means for controlling the pressure of a gas within the receptacle when closed by the photomultiplier, in operation the radiation source being located in the region of the centre of the hemisphere and the photocathode of the photomultiplier seeing the said interior surface.

The cathode of the photomultiplier sees, over a large solid angle, the scintillation produced by the impact of the α particles on the hemispherical scintillator. The scintillator itself serves as a diffusor, and the polished metallic or metallised envelope upon which it is deposited is used as a reflector. Concentration of light (optical coupling) on to the photocathode is therefore optimum, and there is little light dispersion. These conditions are attained only for surface scintillation, and it thus becomes expedient to use the study methods of path spectrometry.

Let us consider the ideal case of a point source consisting of a single-energy α emitter disposed exactly at the centre of a perfect hemisphere, and radiating in isotropic fashion in a solid angle equal to $2\pi$.

At atmospheric pressure, if the radius of the hemisphere is greater than the mean path of the particles, the envelope of the ends of the paths describes a hemisphere which becomes more perfect with a reduction in statistical path dispersion or "straggling" of α particles in the gas used. "Straggling" depends on the nature of the gas, and above all on the energy of the particles. In the ideal case which we have chosen, this dispersion defines an intrinsic power of resolution in transit. In fact, if "straggling" were zero, with progressive reduction in pressure in the hemisphere, the envelope of the ends of the α ray paths, then being a perfect hemisphere, would coincide with that of the hemisphere carrying the scintillator for a precisely determined internal pressure. For this value of pressure $P_o$, assuming zero background noise due to undesired electrons in the photomultiplier and zero light dispersion, the counting level would suddenly change from zero to the maximum value, and the discriminator curve obtained would have the theoretical quasi-rectangular shape which characterises the emission of α particles by a core, except for the fine structure. This theoretical structure is illustrated in FIGURE 1, wherein the pressures P are plotted as abscissae, and the counting level N as ordinates.

In practice, the effect of "straggling" results in distortion of the ideal counting curve illustrated in dashed line in FIGURE 2. FIGURE 2 also comprises a curve in mixed line representing the value of statistical fluctuation due to "straggling."

The principle on which the spectrometer operates consists in obtaining the said spectrum directly by using a single-channel amplitude-selector adjusted to a low threshold, or a multi-channel amplitude-selector so adjusted as to supply an amplitude spectrum, the pressure being fixed at a constant and suitable value.

The bandwidth of the channel and the electronic threshold potential of a single-energy particle, with respect to the maximum height of pulses obtained in vacuo, are very small, so that only end-of-path scintillations, which only deliver low-amplitude pulses at the output of the electronic unit, are counted.

There is, in fact, a relationship between pulse heights and the amounts of energy liberated in the scintillator by the α particles at the end of their paths, that is to say finally between the potential differences read off and the residual paths. The channel width may thus be adjusted so as to correspond to a path equivalent to a fraction of a millimeter (1 to $3/10$ mm.) in air at normal pressure.

Under these conditions, the counting level as a function of pressure passes through a very sharp maximum corresponding to the passage of the greatest number of pulses having heights between the two thresholds determined by the channel width (FIGURE 3), in the case in which pressure is variable and channel width is fixed.

The spectrum obtained with single-energy α radiation, that of Polonium 210 for example, is substantially characteristic of the phenomenon, but with slight weighting towards the lower pressures due to diffusion of the light pulses in the zinc sulphide.

In practice, plane circular sources are used, having finite dimensions which are not negligible with respect to the radius of the hemisphere; the path spectrum which they produce will result substantially from the effect due to "straggling" introduced by geometrical dispersion of the rays emanating from the source, together with light dispersion in the scintillator and the diffusor.

Mathematical study of this problem leads to the following fundamental result: with a plane circular source, of homogeneous activity, emitting in isotropic fashion in a solid angle equal to $2\pi$ and centred with respect to the hemisphere, the position with respect to pressure of the spectral maximum remains invariable whatever the size of the source, and depends only on the gas used, the spectrum supplied by a point source being a limiting case.

Whatever the size of the source, if it is correctly centred, the maximum position will always give the mean path value for a single-energy $\alpha$ particle by simply reading off the pressure in a chamber of known geometrical and physical parameters.

The mean path of the $\alpha$ particles may thus be evaluated with an approximation of the order of 0.5%. The maximum position becomes easier to determine as it becomes sharper, that is to say as the source becomes smaller.

In the case of a source not of point type, it is advantageous to reduce the solid angle over which it radiates in order to reduce errors due to the different paths of the particles emitted. This may be done by slightly channelling the radiation emitted by the source (which reduces the equivalent solid angle to a value of between $0.8$ and $1.5\pi$), and by placing the source off-centre. This method requires preliminary calibration, which must be carried out with known emitters.

The advantages of this appliance are as follows:

(1) Great ease in operation, which enables it to be handled by non-specialised personnel; in particular, it may be very suitable for supervising certain premises.

(2) A spectrum is relatively rapidly obtained.

(3) Possibility of easy decontamination.

(4) Rapidly put into use.

(5) Ruggedness which enables it to be made a portable appliance.

In order that the present invention may be well understood there will now be described one embodiment thereof given by way of example only, reference being had to the accompanying drawing in which.

Figure 1:
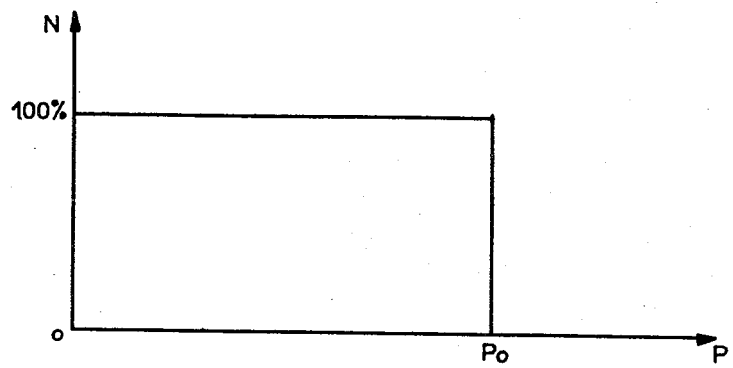
FIGURE 1 is a graphic representation of the theoretical discriminator curve of the present concept with pressures plotted as abscissae and the counting level plotted as ordinates.
Figure 2:
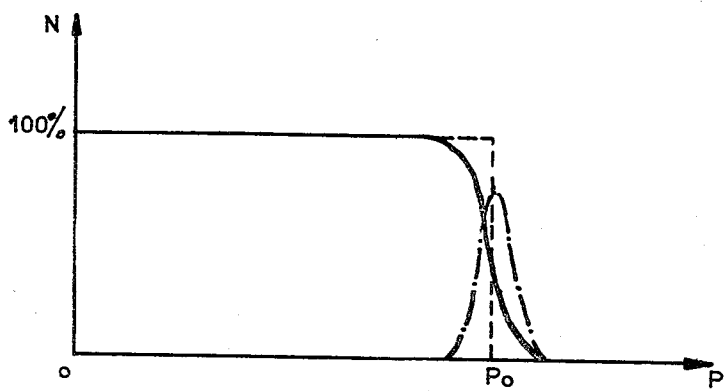
FIGURE 2 is a graphic representation of the curve of FIGURE 1 in dashed line and showing in mixed line the value of statistical fluctuation due to "straggling" of $\alpha$ particles.
Figure 3:
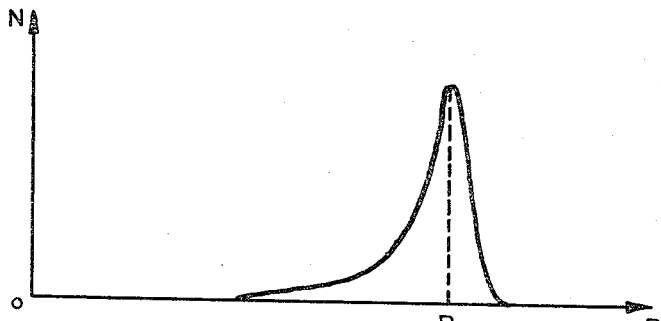
FIGURE 3 is a graphic representation of counting level plotted against pressure showing a very sharp maximum determined by a fixed channel width.
Figure 4:
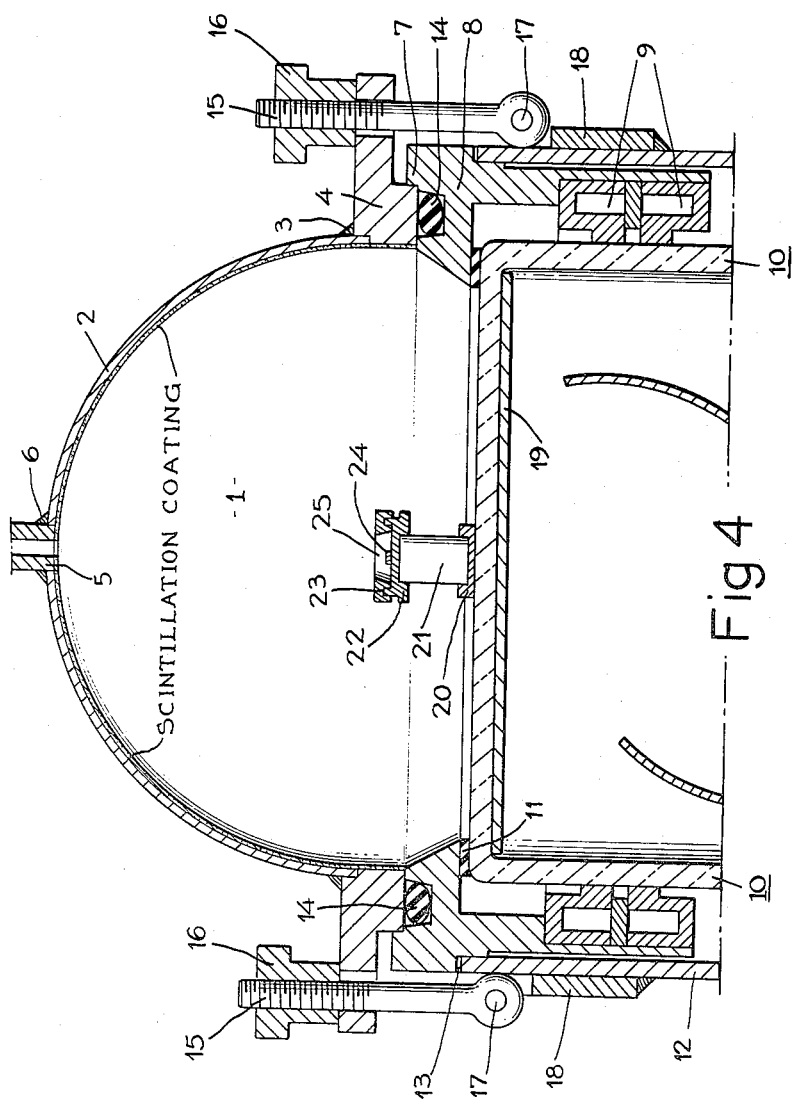
FIGURE 4 illustrates a vertical section through the $\alpha$ spectrometer to which the invention relates.

The apparatus comprises a chamber 1 of the spectrometer consisting of a hemisphere 2 which is internally polished and covered with a coating of a scintillating substance.

The said hemisphere is welded at 3 to a stainless steel ring 4. A gas-inlet duct 5 welded at 6 to the hemisphere 2 enables the pressure of the said gas inside the chamber 1 to be varied by means of a device not illustrated in the figure.

The hemisphere 2 is centred with the aid of a shoulder 7 on to a piece 8 comprising two fluid-tight packings 9. The photomultiplier 10, which is equipped with damping springs, is introduced through the lips of the said packings 9, and bears lightly against a flat and slightly elastic neoprene packing 11. The piece 8 fits on to the casing 12 containing the photomultiplier 10, and rests on a bearer ring with a neoprene packing 13.

A toroid packing 14 is compressed, and thereby makes the chamber fluid-tight with respect to the external medium.

The chamber is closed with the aid of four threaded rods 15, with knurled bolts 16, fitted on pivot pins 17 attached to the casing 12 by the pieces 18.

The source-carrier unit is mounted directly on the photocathode 19 of the photomultiplier with the aid of a holder 20 which is centred with respect to the piece 8.

The source-carrier is made up of three main pieces: a key 21, the source-carrier 22 strictly speaking and a mask 23.

The source 24 is deposited in the cap 25 of the source-carrier 22.

The source having been introduced into the chamber and the electronics suitably adjusted, the spectrum is traced either by discontinuous pressure-variation and counting or, with sources of sufficient activity, by direct recording as a function of time with the aid of a small adjustable leak into the vacuum. The law in accordance with which the gas is evacuated from the chamber must be strictly exponential in this case in order to allow of accurate calibration (the problem of obtaining such adjustable leaks having constant characteristics has been solved by using large-surface microporous membranes).

The path-energy relationship of the $\alpha$ particles enables the power of resolution to be determined as a function of the energy, given the power of resolution as a function of the path. It is of the order of 0.1 mev. for $\alpha$ particles of Po 210 (5.3 mev.) with small-diameter sources. The use of large-diameter hemispheres coupled to large-cathode photomultipliers enables sources of considerable dimensions (up to 7 cm.$^2$) to be used, with acceptable powers of resolution as a function of energy (3 to 5%).

Figure 5:
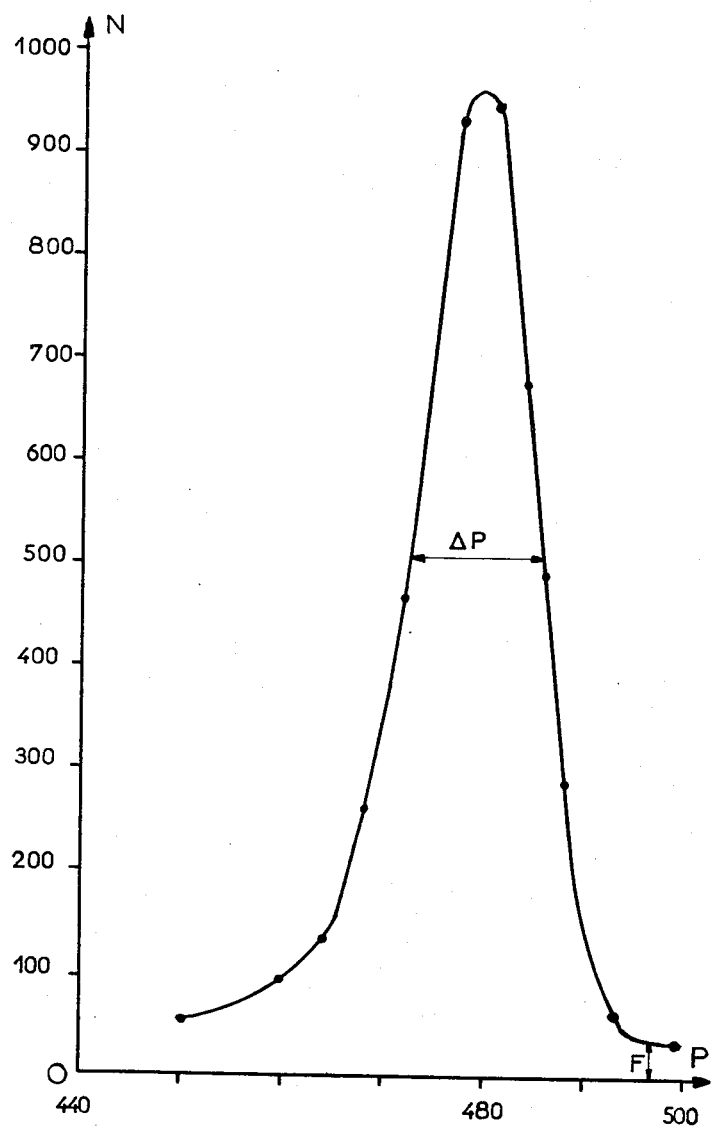
FIGURE 5 illustrates a curve obtained with the $\alpha$ spectrometer to which the invention relates.

FIGURE 5 shows the curve representing the number of impacts in arbitrary units (on the axis of the ordinates ON) as a function of pressure (on the axis of the abscissae OP) for a small Po 210 source.

This source, which is twelve millimetres in diameter in the constructional example according to the invention, is covered by a mask pierced with an aperture two millimetres in diameter; this aperture fulfils the function of a collimator, and improves the power of resolution, which depends on the dimensions of the source. The hemisphere is 122 millimetres in diameter; it is internally covered with a thin coating of zinc sulphide whereof the thickness depends on the grain size, this being so that the whole surface is effectively covered.

The zinc sulphide used as a scintillator is silver-activated. The power of resolution as a function of the energy, regard being had to the path-energy relationship, is in the region of 90 kev.

I claim:

1. Apparatus for determining the spectrum of an $\alpha$-emitting radioactive source, a photomultiplier, a hemispherical receptacle mounted upon said photomultiplier in sealing engagement therewith and on a great circle of the photocathode thereof, a reflective scintillating interior surface in said receptacle, a gas inlet duct in said receptacle for controlling the pressure of a gas within said receptacle and a radiation source located in the region of the centre of said hemispherical receptacle.

2. Apparatus for determining the spectrum of an $\alpha$-emitting radioactive source, a photomultiplier, a hemispherical receptacle mounted upon said photomultiplier in sealing engagement therewith, and on a great circle of the photocathode thereof, an interior surface in said receptacle, a non-reflective scintillating substance coating said interior surface, a gas inlet duct in said receptacle for controlling the pressure of a gas within said receptacle and a radiation source located in the region of the centre of said hemispherical receptacle.

3. Apparatus according to claim 2 in which said interior surface is polished metal and said substance is silver-activated zinc sulphide.

4. Apparatus according to claim 2 including a frame, a centring shoulder for said receptacle releasably coupled to said frame and sealing means between said shoulder and said frame.

5. Apparatus according to claim 4 including fluid-tight sealing means between said frame and said photomultiplier.

6. Apparatus according to claim 5 in which said gas inlet duct communicates between the interior of said receptacle and the exterior thereof.

7. In a method for testing a radioactive substance, the steps of positioning a body of the substance in the region of the centre of a hemispherical scintillating surface scanned by the photocathode of a photomultiplier, discontinuously varying the pressure of a gas within the hemispherical surface and counting the output of the photomultiplier for each value of pressure to trace the spectrum of the source.

8. In a method for testing a radioactive substance, the steps of positioning a body of the substance in the region of the centre of a hemispherical scintillating surface scanned by the photocathode of a photomultiplier and continuously varying the pressure of a gas within the hemispherical surface and counting the output of the photomultiplier as a function of time.

References Cited in the file of this patent

UNITED STATES PATENTS

| | | |
|---|---|---|
| 2,841,715 | Schultz | July 1, 1958 |
| 2,900,516 | Davis et al. | Aug. 18, 1959 |
| 2,908,819 | Marx | Oct. 13, 1959 |

OTHER REFERENCES

Los Alamos Gas Counters, by Northrop et al., from Nucleonics, vol. 14, No. 4, April 1956; pages 36 and 37.